United States Patent
Chung et al.

(10) Patent No.: US 10,105,645 B2
(45) Date of Patent: Oct. 23, 2018

(54) METHOD AND SYSTEM FOR SELECTIVE NONCATALYTIC $NO_x$ REDUCTION

(71) Applicant: CORNING INCORPORATED, Corning, NY (US)

(72) Inventors: Mao Lin Chung, Kaohsiung (TW); Chun-Ho Li, Miaoli (TW); Matthew James Maslyn, Painted Post, NY (US); Fang Chih Wu, Kaohsiung (TW)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 15/561,762

(22) PCT Filed: Mar. 22, 2016

(86) PCT No.: PCT/US2016/023502
§ 371 (c)(1),
(2) Date: Sep. 26, 2017

(87) PCT Pub. No.: WO2016/154161
PCT Pub. Date: Sep. 29, 2016

(65) Prior Publication Data
US 2018/0078897 A1    Mar. 22, 2018

Related U.S. Application Data

(60) Provisional application No. 62/138,782, filed on Mar. 26, 2015.

(51) Int. Cl.
*B01D 53/34* (2006.01)
*B01D 53/56* (2006.01)
*B01D 53/78* (2006.01)

(52) U.S. Cl.
CPC .......... *B01D 53/343* (2013.01); *B01D 53/56* (2013.01); *B01D 2251/206* (2013.01);
(Continued)

(58) Field of Classification Search
CPC ................. B01D 53/343; B01D 53/56; B01D 2251/206; B01D 2259/65;
(Continued)

(56) References Cited

U.S. PATENT DOCUMENTS 7,198,698 B1* 4/2007 Richards ............. B01D 53/007
204/157.3
7,648,673 B2   1/2010 Reiter et al.
(Continued)

FOREIGN PATENT DOCUMENTS

CN        203355611 U     12/2013

OTHER PUBLICATIONS

International Search Report and Written Opinion of the International Searching Authority; PCT/US2016/023502; dated May 31, 2016; 13 Pages; European Patent Office.

*Primary Examiner* — Timothy C Vanoy
(74) *Attorney, Agent, or Firm* — Ryan T. Hardee (57) ABSTRACT

Disclosed herein are methods for treating an exhaust stream comprising NOx, the methods comprising receiving an exhaust stream and combining it with at least one nitrogen-containing reagent to form a combined stream, heating the combined stream to a reaction temperature ranging from about 870° C. to about 1100° C. to react at least a portion of the nitrogen-containing component, cooling the reacted stream in a first cooling step to a first temperature, and optionally further cooling the reacted stream in a second cooling step to a second temperature, wherein the first cooling step comprises heat exchange between at least a portion of the exhaust stream and at least a portion of the reacted stream. Exhaust treatment systems are also disclosed herein.

23 Claims, 2 Drawing Sheets

(52) U.S. Cl.
CPC ......... *B01D 2251/2062* (2013.01); *B01D 2251/2067* (2013.01); *B01D 2257/404* (2013.01); *B01D 2259/65* (2013.01)

(58) Field of Classification Search
CPC ...... B01D 2251/2067; B01D 2257/404; B01D 2251/2062; B01D 53/78; B01J 19/00; B01J 10/00; F28D 2021/0022; F28D 2021/0024

See application file for complete search history.

(56) References Cited

U.S. PATENT DOCUMENTS

| | | | |
|---|---|---|---|
| 7,682,586 B2 | 3/2010 | Harold et al. | |
| 7,867,462 B2* | 1/2011 | Cochran | B01D 53/501 423/210 |
| 8,613,896 B2* | 12/2013 | Angelides | B01D 53/8625 422/207 |
| 2008/0206120 A1 | 8/2008 | Grochowski | |
| 2009/0078177 A1* | 3/2009 | Wu | B01D 53/343 110/233 |
| 2011/0311424 A1 | 12/2011 | Ellery | |
| 2012/0141346 A1* | 6/2012 | Pfeffer | B01D 53/56 423/235 |
| 2016/0199779 A1 | 7/2016 | Rohloff et al. | |

\* cited by examiner

FIG. 2

METHOD AND SYSTEM FOR SELECTIVE NONCATALYTIC $NO_x$ REDUCTION

CROSS-REFERENCE TO RELATED APPLICATIONS

This application claims the benefit of priority under 35 U.S.C. § 371 of International Patent Application Serial No. PCT/US16/23502, filed on Mar. 22, 2016, which in turn, claims the benefit of priority of U.S. Provisional Patent Application Ser. No. 62/138,782 filed on Mar. 26, 2015, the contents of each of which are relied upon and incorporated herein by reference in their entireties.

FIELD OF THE DISCLOSURE

The present disclosure relates generally to methods and systems for treating exhaust streams, and more particularly to methods and systems for the selective noncatalytic reduction of exhaust streams comprising $NO_x$.

BACKGROUND

Environmental remediation processes are useful in a wide variety of industrial applications, including fuel, metallurgy, and glass processing applications, to name a few. Nitrogen oxides ($NO_x$) can be present as a pollutant in a number of process emissions. For instance, combustion reactions can generate $NO_x$ emissions, such as reactions carried out by heaters, dryers, furnaces, and similar equipment.

Untreated $NO_x$ emissions can present numerous threats to humans, wildlife, plant life, and the environment. Exposure to $NO_x$ can cause irritation, adverse reactions, and sickness in humans and animals. Prolonged exposure can be fatal. $NO_x$ emissions (e.g., NO, $NO_2$) released into the atmosphere can decompose on contact with water to produce nitrous acid ($HNO_2$) and nitric acid ($HNO_3$), e.g., acid rain, which can be highly destructive to plant life and man-made structures. $NO_x$ emissions (e.g., NO) can also react with oxygen in the lower atmosphere to form ozone, for example, by the reaction: $NO+HC+O_2+sunlight \rightarrow NO_2+O_3$. Ozone can cause health hazards to humans and wildlife, as well as causing damage to plant life. $NO_x$ emissions (e.g., $NO_2$) can also contribute to smog, which can form when sunlight contacts a mixture of $NO_2$ and uncombusted hydroarbons in the atmosphere.

Various environmental regulations, such as the Kyoto Protocol, have thus been put in place to reduce $NO_x$ emissions for the protection of society against harmful pollutants. Before these regulations were in effect, flue gases from combustion processes were vented directly into the atmosphere. As air quality regulations tighten and public awareness increases, however, industry leaders have begun employing various strategies for reducing $NO_x$ emissions. These strategies include, for example, pre-treatment, combustion modifications, process modifications, and post-treatment strategies for reducing $NO_x$ emitted into the environment.

Pre-treatment strategies include modifying or treating feed materials (e.g., fuel, oxidizer, and/or materials to be heated) to reduce the potential for $NO_x$ formation. Combustion modifications include changing the reaction process such as reducing excess air levels or air preheating. Process modifications include making changes to existing processes such as modifying equipment, firing rates, and/or thermal efficiency. Finally, post-treatment strategies can include removing $NO_x$ from exhaust streams after it has already formed. Reducing agents, such as CO, $CH_4$ and other hydrocarbons, ammonia, etc., can be used to convert $NO_x$ into $N_2$ gas. A catalyst can also be used to promote such reactions in some instances.

Post-treatment methods employing a catalyst are often referred to as selective catalytic reduction (SCR). SCR can control $NO_x$ emissions by reacting it with $NH_3$ in a catalyst bed to form $N_2$ and $H_2O$. Conventional catalysts can include, for example, base metal catalysts, which can contain titanium and/or vanadium oxides and/or molybdenum, tungsten, or other elements. SCR can have numerous drawbacks including, for example, high material cost and/or process complexity, as well as the potential for catalyst plugging or poisoning by pollutants in the flue gases. Selective noncatalytic reduction (SNCR) is an alternative method which may provide various advantages in terms of process cost and/or complexity, as well as the ability to retrofit existing equipment. SNCR involves the reaction of a nitrogen-containing reagent, such as ammonia or urea, with $NO_x$ to produce nitrogen gas ($N_2$), carbon dioxide ($CO_2$), and water ($H_2O$). For example, urea can be combined with water and used to treat $NO_x$ emissions, or ammonia can be added alone as a liquid or a gas, as shown by the following reactions.

$$NH_2CONH_2+H_2O \rightarrow 2NH_3+CO_2$$

$$4NO+4NH_3+O_2 \rightarrow 4N_2+6H_2O$$

The reaction mechanism comprises the attachment of $NH_2$ radicals to NO molecules and their subsequent decomposition into $N_2$ and $H_2O$.

While SNCR can be advantageous for the treatment of $NO_x$ emissions, these reactions also have a number of limitations. For example, SNCR reactions can be limited by an effective temperature range of about 870° C. to about 1100° C. At temperatures below about 870° C., the reagent and $NO_x$ may not react effectively. Unreacted reagent is generally undesirable because it can react with other combustion species to form undesired byproducts. For example, unreacted ammonia (often called "ammonia slip") can react with combustion species such as sulfur trioxide ($SO_3$) to form ammonium salts. At temperatures above about 1100° C., the reagent may decompose and form $NO_x$ rather than reduce it. For example, in the case of ammonia the following reaction can occur: $4NH_3+5O_2 \rightarrow 4NO+6H_2O$. Accordingly, it can be important to maintain a sufficient residence time in the appropriate temperature window to maximize the efficiency of SNCR and minimize any potential downside. It would thus be advantageous to provide an efficient, cost-effective, easily operable process for treating exhaust streams comprising $NO_x$. It would be further advantageous to provide SNCR methods with energy recycle and/or recovery features to efficiently heat exhaust gases to a temperature within the effective temperature range and/or to cool the exhaust gases before venting.

SUMMARY

The disclosure relates, in various embodiments, to methods for treating an exhaust stream, the methods comprising receiving an exhaust stream comprising $NO_x$, combining the exhaust stream with at least one nitrogen-containing reagent to form a combined stream, heating the combined stream to a reaction temperature ranging from about 870° C. to about 1100° C. to react at least a portion of the nitrogen-containing reagent, cooling the reacted stream in a first cooling step to a first temperature, and optionally further cooling the reacted stream in a second cooling step to a second temperature, wherein the first cooling step comprises heat exchange between at least a portion of the exhaust stream and at least a portion of the reacted stream.

Also disclosed herein are methods for treating an exhaust stream, the methods comprising receiving an exhaust stream comprising $NO_x$, preheating the exhaust stream to a first temperature; combining the exhaust stream with at least one nitrogen-containing reagent to form a combined stream; heating the combined stream to a reaction temperature ranging from about 870° C. to about 1100° C. to react at least a portion of the nitrogen-containing reagent; and cooling the reacted stream to a second temperature; wherein at least one of cooling the reacted stream and preheating the exhaust stream comprises heat exchange between at least a portion of the reacted stream and at least a portion of the exhaust stream.

Further disclosed herein are systems for treating an exhaust stream comprising $NO_x$, the systems comprising a heating vessel for heating a combined stream comprising the exhaust stream and at least one nitrogen-containing reagent to a reaction temperature; and a first heat exchanger for cooling the reacted stream to a first temperature, wherein the first heat exchanger conducts heat exchange between at least a portion of the exhaust stream and at least a portion of the reacted stream. The systems disclosed herein can further comprise a vessel for receiving the exhaust stream and combining it with the at least one nitrogen-containing reagent; a reaction vessel for holding the combined stream at the reaction temperature for a residence time sufficient to react at least a portion of the $NO_x$; and/or a second heat exchanger for further cooling the reacted stream to a second temperature.

Additional features and advantages will be set forth in the detailed description which follows, and in part will be readily apparent to those skilled in the art from that description or recognized by practicing the invention as described herein, including the detailed description which follows, the claims, as well as the appended drawings.

It is to be understood that both the foregoing general description and the following detailed description present various embodiments, and are intended to provide an overview or framework for understanding the nature and character of the invention as it is claimed. The accompanying drawings are included to provide a further understanding, and are incorporated into and constitute a part of this specification. The drawings illustrate various embodiments and together with the description serve to explain the principles and operations of the invention.

BRIEF DESCRIPTION OF THE DRAWINGS

The following detailed description can be best understood when read in conjunction with the following drawings, where like structures are indicated with like reference numerals and in which.

DETAILED DESCRIPTION

Disclosed herein are methods for treating an exhaust stream, the methods comprising receiving an exhaust stream comprising $NO_x$, combining the exhaust stream with at least one nitrogen-containing reagent to form a combined stream, heating the combined stream to a reaction temperature ranging from about 870° C. to about 1100° C. to react at least a portion of the nitrogen-containing reagent, cooling the reacted stream in a first cooling step to a first temperature, and optionally further cooling the reacted stream in a second cooling step to a second temperature, wherein the first cooling step comprises heat exchange between at least a portion of the exhaust stream and at least a portion of the reacted stream. Also disclosed herein are methods for treating an exhaust stream, the methods comprising receiving an exhaust stream comprising $NO_x$, preheating the exhaust stream to a first temperature; combining the exhaust stream with at least one nitrogen-containing reagent to form a combined stream; heating the combined stream to a reaction temperature ranging from about 870° C. to about 1100° C. to react at least a portion of the nitrogen-containing reagent; and cooling the reacted stream to a second temperature; wherein at least one of cooling the reacted stream and preheating the exhaust stream comprises heat exchange between at least a portion of the reacted stream and at least a portion of the exhaust stream.

As used herein, the terms "$NO_x$," "nitrogen oxides," and variations thereof are intended to refer to oxides of nitrogen other than nitrous oxide ($N_2O$). NO can include, for example, nitric oxide (NO), nitrogen dioxide ($NO_2$), nitrogen tetroxide ($N_2O_4$), and nitrogen pentoxide ($N_2O_5$), to name a few. In certain embodiments, nitric oxide (NO) can make up the majority of a process exhaust stream, such as greater than 50% by weight NO, greater than 60%, greater than 70%, greater than 80%, greater than 90%, or greater than 95% by weight NO. Without wishing to be bound by theory, it is believed that NO formation can take place by way of three generally accepted mechanisms: thermal $NO_x$, prompt $NO_x$, and raw material $NO_x$.

Thermal NO denotes the high-temperature reaction of nitrogen with oxygen by the Zeldovich mechanism: $N_2+O_2 \rightarrow NO+NO_2$. Above 1100° C., thermal NO is believed to be the predominant mechanism for NO formation in a combustion process. Prompt NO denotes a relatively fast reaction between nitrogen, oxygen, and a hydrocarbon radical, for example: $CH_4+O_2+N_2 \rightarrow NO+NO_2+CO_2+H_2O$+trace species. Prompt NO formation can occur in combustion processes operating at lower temperatures and is believed to be a predominant mechanism in fuel-rich conditions. Raw material NO denotes the direct oxidation of nitrogen compounds contained in a raw material, for example: $R_xN+O_2 \rightarrow NO$, $NO_2+CO_2+H_2O$+trace species. Without wishing to be bound by theory, it is believed that raw material $NO_x$ may be the predominant mechanism for NO formation in combustion processes involving high-quality gaseous fuels, such as natural gas or propane (e.g., fuels having no organically bound nitrogen), and processes involving raw materials containing significant amounts of organically bound nitrogen (e.g., strontium nitrate).

Figure 1:
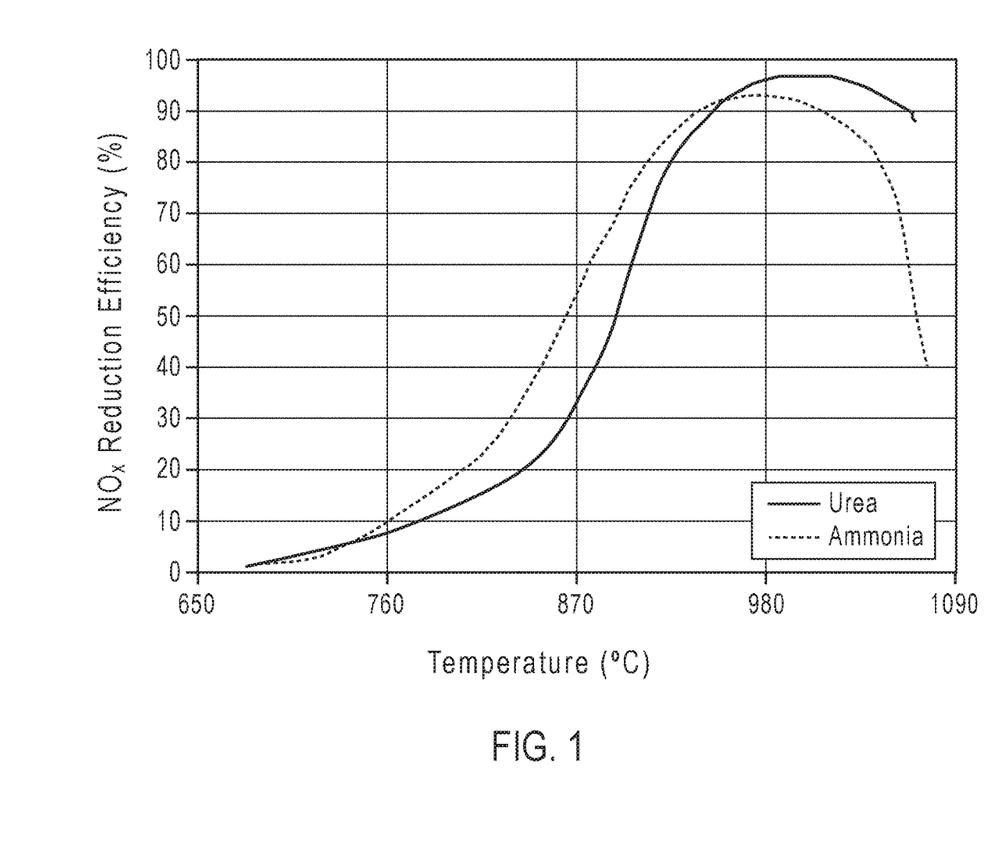
FIG. 1 is a graphical depiction of NO reduction efficiency as a function of reaction temperature.

As discussed above, selective noncatalytic reduction of NO can proceed efficiently in a reaction temperature range of about 870° C. to about 1100° C. FIG. 1 is a graphical depiction of NO reduction efficiency as a function of reaction temperature for two exemplary nitrogen-containing reactants, according to the EPA Air Pollution Control Cost Manual, Report No. EPA/452/B-02-001. As shown in FIG. 1, both ammonia and urea exhibit maximum NO reduction efficiency in the 870-1100° C. temperature range, which may be bounded, for example, by inefficient reaction between the reactant and $NO_x$ at lower temperatures and decomposition of the reactant at higher temperatures. In existing processes it can be difficult to provide exhaust streams at temperatures within the optimal $NO_x$ reduction temperature range. Often these streams need to be heated to increase and maintain the stream temperature to within the desired temperature range. However, the input of additional energy needed to preheat the exhaust stream can be costly, making the SNCR process less energy efficient and/or less cost efficient.

Figure 2:
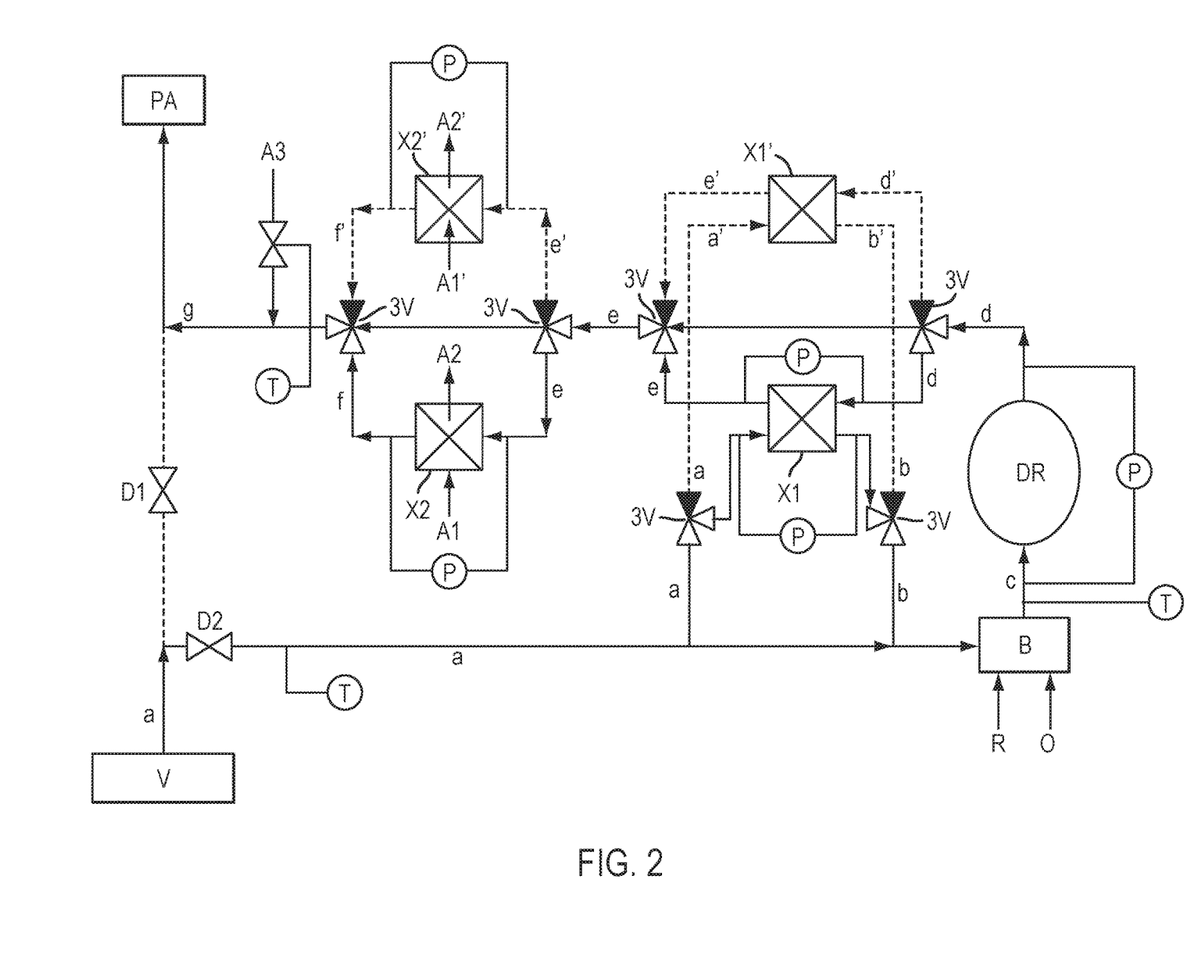
FIG. 2 is a schematic depicting an exhaust treatment system according to various embodiments of the disclosure.

FIG. 2 depicts an exemplary exhaust treatment system according to various embodiments of the disclosure. Processes without exhaust treatment may vent exhaust gas a comprising $NO_x$ from a process vent V through an exit control damper D1 and straight out into the atmosphere via a pollution abatement PA system. However, in exemplary processes according to the instant disclosure, the exhaust stream a exiting a process vent V can be directed through a control damper D2 to a burner B. A temperature sensor T can optionally be employed to measure the temperature of the exhaust stream a. Prior to entering the burner B, the exhaust stream a can be preheated in heat exchanger X1 by counter flow with reacted stream d. The temperature of exhaust stream a can thus be raised in the heat exchanger X1 and can exit as preheated exhaust stream b, which can then be further heated in the burner B. Additional streams, including a nitrogen-containing reactant R and an oxygen-containing stream O, can be introduced into the burner B and combined with the preheated exhaust stream b. The heated stream c exiting the burner B can have a temperature (optionally measured by a temperature sensor T) within a desired reaction temperature range (e.g., about 870-1100° C.). The combined stream c can thus proceed to a $deNO_x$ reaction vessel DR, in which the combined stream c can be held at a reaction temperature for a residence time sufficient to at least partially reduce or react the $NO_x$ in the exhaust stream. The reacted stream d exiting the reaction vessel DR can then be used as an energy recycle stream passing through the first heat exchanger X1 to preheat the exhaust stream a. The heat transfer between streams a and d can provide energy savings by recycling internal energy to reduce the amount of external added energy needed to preheat the exhaust stream to the desired reaction temperature range.

In some embodiments, further energy recovery can be achieved using a second heat exchanger X2. For instance, the cooled reacted stream e exiting the first heat exchange X1 can be further cooled in heat exchanger X2 by counter-flow with an external stream A1. The external stream A1 can absorb the heat energy from the cooled reacted stream e and the resulting modified stream A2 can be used to heat or cool other process components or streams. As such, additional thermal energy from the SNCR process can be recovered and harnessed for use. In addition, the cooled reacted stream e can be cooled to form exit stream f, which may advantageously have a lower temperature suitable for venting to the atmosphere.

Some conventional methods for cooling exhaust streams prior to venting can include diluting the stream with an ambient or chilled gas stream, e.g., ambient air, to lower the stream temperature. However, these methods can overload the pollution abatement system PA with excessive volumes of gas. By cooling the reacted streams (d, e) by way of heat exchangers (X1, X2), additional gas volume need not be added to the exhaust stream before being vented, thereby reducing the load on the pollution abatement system PA. Of course, in certain embodiments the exhaust stream can be diluted with an external stream before venting if desired. For example, the exit stream f can be diluted with external stream A3 to form a cooled exit stream g before venting to the pollution abatement system PA. An optional temperature sensor T can be employed to measure the temperature of the exit streams f or g and/or of the external stream A3, if desired.

In certain embodiments, one or more differential pressure sensors P can be employed throughout the exhaust system to ensure that differential pressure does not exceed acceptable values (e.g., greater than about 1 inch of water column) at various points throughout the SNCR process. Backup heat exchangers X1' and X2' can be employed as standby units in case differential pressure rises to an unacceptable value. In such a situation, streams a, d, and/or e can be rerouted to backup heat exchangers X1' and/or X2' as streams a', d', and/or e', thereby yielding streams b', and f'. For instance, one or more three-way valves 3V can be employed to direct streams a, b, d, e, f, a', b', d', e', and f' as desired, e.g., by opening or closing one or more flow pathways. In FIG. 2, closed valve portions are indicated by darkened triangles and closed pathways are indicated by dotted lines; however, it is to be understood that any valve and pathway arrangement is possible, depending on relevant process parameters, and envisioned as falling within the scope of the disclosure. Additionally, the operation of backup heat exchanger X2' can include a backup external stream A1' and modified backup external stream A2'.

According to various embodiments, the exhaust stream a exiting the process vent V can comprise $NO_x$. The exhaust stream a can comprise, for example, from about 500 ppm (parts per million) to about 1500 ppm of $NO_x$, such as from about 600 ppm to about 1250 ppm, or from about 750 ppm to about 1000 ppm of $NO_x$, including all ranges and subranges therebetween. In some embodiments, the exhaust stream a can comprise from about 200 ppm to about 1500 ppm NO, such as from about 300 ppm to about 1250 ppm, from about 400 ppm to about 1000 ppm, or from about 500 ppm to about 750 ppm of NO, including all ranges and subranges therebetween. The temperature of the exhaust stream a can range, in some instance, from about 100° C. to about 600° C., such as from about 200° C. to about 500° C., or from about 300° C. to about 400° C., including all ranges and subranges therebetween. The flowrate of the exhaust stream a can range, for example, from about 1000 kg/hr to about 10000 kg/hr, such as from about 1500 kg/hr to about 7500 kg/hr, from about 2000 kg/hr to about 6500 kg/hr, or from about 4500 kg/hr to about 5500 kg/hr, including all ranges and subranges therebetween.

According to various embodiments, at least a portion of the exhaust stream a can be directed through the first heat exchanger X1 to be preheated by heat exchange with reacted stream d. For instance, at least about 50% by volume of the exhaust stream a can be directed through heat exchanger X1, such as at least 60%, at least 70%, at least 80%, at least 90%, or 100% of the exhaust stream a can be directed through heat exchanger X1, including all ranges and subranges therebetween. After heat exchange, the pre-heated exhaust stream b can have a temperature ranging, for example, from about 200° C. to about 800° C., such as from about 250° C. to about 750° C., from about 300° C. to about 700° C., from about 400° C. to about 650° C., or from about 450° C. to about 500° C., including all ranges and subranges therebetween. The preheated exhaust stream b can be combined with any remaining portion of exhaust stream a, if applicable, and/or can be combined with a stream comprising at least one nitrogen-containing reagent N and/or a stream O comprising oxygen (e.g., $O_2$, air, etc.).

The at least one nitrogen-containing reagent can be chosen, for example, from urea, ammonia, cyanuric acid, hydrazine, similar nitrogen-containing compounds, and combinations thereof. In certain embodiments, the nitrogen-containing reagent can be urea, which can be combined with water to form an aqueous solution. The aqueous solution can react during the SNCR process to form ammonia, which can then react with $NO_x$ to form $N_2$ and $H_2O$. In other embodiments, liquid or gaseous ammonia can be added as the nitrogen-containing reagent. The nitrogen-containing reagent can be combined directly with the preheated exhaust stream b or can be added as a separate stream to the burner B.

The nitrogen-containing reagent can be added in any amount suitable to achieve the desired $NO_x$ reduction level. Normal stoichiometric ratio (NSR) can be used to describe the molar ratio $N/NO_x$ between the reagent and the $NO_x$ in the exhaust stream. For instance, if one mole of ammonia is injected for each mole of $NO_x$, the NSR is one (one mole of ammonia will react with one mole of $NO_x$). If one mole of urea is injected for each mole of $NO_x$, the NSR is two (one mole of urea will react with two moles of $NO_x$). Higher NSR can result in a greater $NO_x$ reduction; however, at a certain point additional reagent amounts will have a diminishing effect on $NO_x$ reduction, which can result in reagent waste and/or unwanted unreacted reagent in the exhaust stream. According to various embodiments, the NSR can range from about 1 to about 3, such as from about 1.5 to about 2, or from about 1 to about 2.5, including all ranges and subranges therebetween.

Optional additives can be included, either as additives to any stream entering the burner B, as separate streams entering the burner B, as additives to the preheated stream b or the heated stream c, or as a separate stream entering the deNO$_x$ reactor DR. For example, chemical additives can be added to improve $NO_x$ reduction efficiency, reduce equipment maintenance, and/or to expand the temperature window within which SNCR is effective. Hydrogen gas is a non-limiting example of such an additive. These additives can be added, in certain embodiments, in amounts ranging from about 1% to about 5% by weight, such as from about 2% to about 3% by weight, including all ranges and subranges therebetween.

The combined streams can be heated in burner B to a desired reaction temperature. For example, the burner B can produce a heated stream c having a temperature ranging from about 870° C. to about 1100° C., such as from about 900° C. to about 1050° C., or from about 950° C. to about 1000° C., including all ranges and subranges therebetween. The heated stream c can then be introduced into deNO$_x$ reactor DR, in which it can be held at the chosen reaction temperature or reaction temperature range, for a residence time sufficient to react at least a portion of the $NO_x$, e.g. to produce $N_2$. The residence time can range, for example, from about 0.1 seconds to about 3 seconds, such as from about 0.3 seconds to about 2.5 seconds, from about 0.5 seconds to about 2 seconds, or from about 1 second to about 1.5 seconds, including all ranges and subranges therebetween. In certain embodiments, the residence time can be chosen as appropriate to reach a desired NO reduction efficiency. For example, at least about 30% by weight of NO in the exhaust stream can be reacted to form $N_2$, such as at least about 35%, 40%, 45%, 50%, 55%, 60%, 65%, 70%, 75%, 80%, 85%, 90%, 95%, or 100% by weight of the $NO_x$ can be reacted, including all ranges and subranges therebetween. At least a portion of the at least one nitrogen-containing reagent can be reacted with the $NO_x$, such as at least about 5% by weight, or at least about 10%, 15%, 20%, 25%, 30%, 35%, 40%, 45%, 50%, 55%, 60%, 65%, 70%, 75%, 80%, 85%, 90%, 95%, or 100% by weight of the nitrogen-containing reagent can be reacted.

According to various embodiments, at least a portion of the reacted stream d exiting the deNO$_x$ reactor can be introduced into the first heat exchanger X1 to recycle heat energy to exhaust stream a. For example, in some embodiments, the reacted stream d can flow in a direction opposite the direction of flow of exhaust stream a, and heat exchange can occur between the two streams in counterflow. Stream counterflow can, in various embodiments, increase the heat transfer rate between the streams. Of course, other arrangements for heat exchange between the streams (such as same direction of flow) are possible and envisioned as falling within the scope of the disclosure. By way of a non-limiting example, at least about 50% by volume of the reacted stream d can be used to transfer heat energy to exhaust stream a, such as at least 60%, at least 70%, at least 80%, at least 90%, or 100% by volume of reacted stream d, including all ranges and subranges therebetween. The reacted stream d can have a temperature up to about 1100° C., such as ranging from about 900° C. to about 1000° C., for example, up to about 950° C., 1000° C., 1050° C., or 1100° C., including all ranges and subranges therebetween. In certain embodiments, the reacted stream d can be cooled in heat exchanger X1 to produce cooled reacted stream e, which can have a temperature ranging from about 700° C. to about 900° C., or in some instances, from about 700° C. to about 950° C., such as from about 750° C. to about 900° C., or from about 800° C. to about 850° C., including all ranges and subranges therebetween.

At least a portion of cooled reacted stream e can be further cooled in a second heat exchanger X2. In certain embodiments, energy transfer in heat exchanger X2 can take place between an external stream A1 with the cooled reacted stream e, e.g., by stream counterflow. For example, the external stream can be an ambient or cooled stream, which can be gas or liquid. According to various embodiments, the external stream A1 can comprise ambient or chilled air or water, or any other gas or liquid suitable for cooling a stream to the desired temperature. For instance, the exit stream f leaving heat exchanger X2 can have a temperature ranging from about 300° C. to about 500° C., or in some instances, from about 300° C. to about 650° C., such as from about 350° C. to about 600° C., from about 400° C. to about 550° C., or from about 450° C. to about 500° C., including all ranges and subranges therebetween. The modified external stream A2 can exit the heat exchanger X2, e.g., as heated air or steam, which can then be used as a process stream in a related or unrelated downstream process, such as an absorption chiller, heat pump, waste heat boiler, and the like.

The exit stream f can be vented to the pollution abatement system PA, or can be further treated to produce cooled exit stream g, e.g., by diluting with an external stream A3 to further reduce the temperature of the stream prior to venting. In some non-limiting embodiments, the exit stream f can be diluted with ambient air. For instance, external stream can be added to the exit stream f at a volumetric ratio ranging from about 2:1 to about 1:10, such as from about 1:1 to about 1:8, from about 1:2 to about 1:7, from about 1:3 to about 1:6, or from about 1:4 to about 1:5, including all ranges and subranges therebetween. The temperature of cooled exit stream g can range, in non-limiting embodiments, from about 25° C. to about 400° C., such as from about 50° C. to about 350° C., from about 75° C. to about 300° C., from about 100° C. to about 250° C., or from about 150° C. to about 200° C., including all ranges and subranges therebetween.

Also disclosed herein is a system for treating an exhaust stream comprising $NO_x$. Referring back to FIG. 2, the system can comprise a heating vessel (e.g., burner B) for heating a combined stream comprising the exhaust stream and at least one nitrogen-containing reagent. The system can further comprise a reaction vessel (e.g., $deNO_x$ reactor DR) for holding the combined stream at the reaction temperature for a residence time sufficient to react at least a portion of the $NO_x$. Further included in the system is a first heat exchanger (e.g., X1) for cooling the reacted stream to a first temperature, and optionally a second heat exchanger (e.g., X2) for further cooling the reacted stream to a second temperature. The first heat exchanger X1 can exchange heat between at least a portion of the exhaust stream a and at least a portion of the reacted stream d. The second heat exchanger X2 can exchange heat between at least a portion of the cooled reacted stream e and an external stream A1.

The methods and systems disclosed herein can provide numerous advantages over prior art methods for treating exhaust streams comprising $NO_x$. For instance, by conducting heat exchange between at least a portion of the reacted stream and at least a portion of the exhaust stream to be treated, dual objectives can be achieved including cooling the reacted stream and preheating the exhaust stream. Preheating the exhaust stream using existing heat energy from within the SNCR process can reduce the heating duty that may otherwise be required to raise the exhaust stream temperature to within a desired reaction temperature range. Similarly, cooling the reacted stream using the incoming exhaust stream can reduce the temperature of the stream venting to the pollution abatement system without diluting the stream and/or requiring additional energy. Furthermore, additional heat exchange between the reacted stream and an external stream can achieve dual objectives including further cooling the reacted stream and recovery of energy from the reacted stream that can be transferred to other processes.

It will be appreciated that the various disclosed embodiments may involve particular features, elements or steps that are described in connection with that particular embodiment. It will further be appreciated that a particular feature, element or step, although described in relation to one particular embodiment, may be interchanged or combined with alternate embodiments in various non-illustrated combinations or permutations.

It is to be understood that, as used herein the terms "the," "a," or "an," mean "at least one," and should not be limited to "only one" unless explicitly indicated to the contrary. Thus, for example, reference to "an additive" includes examples having two or more such "additives" unless the context clearly indicates otherwise.

Ranges can be expressed herein as from "about" one particular value, and/or to "about" another particular value. When such a range is expressed, examples include from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint.

Various ranges are expressed herein as "greater than about" one or more particular values or "less than about" one or more particular values and "all ranges and subranges therebetween." When such ranges are expressed, examples include from any one particular value to any other particular value, and all other possible ranges between each disclosed value.

All numerical values expressed herein are to be interpreted as including "about," whether or not so stated, unless expressly indicated otherwise. It is further understood, however, that each numerical value recited is precisely contemplated as well, regardless of whether it is expressed as "about" that value. Thus, "a temperature greater than 1000° C." and "a temperature greater than about 1000° C." both include embodiments of "a temperature greater than about 1000° C." as well as "a temperature greater than 1000° C."

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that any particular order be inferred.

While various features, elements or steps of particular embodiments may be disclosed using the transitional phrase "comprising," it is to be understood that alternative embodiments, including those that may be described using the transitional phrases "consisting" or "consisting essentially of," are implied. Thus, for example, implied alternative embodiments to a method comprising A+B+C include embodiments where the method consists of A+B+C, and embodiments where the method consists essentially of A+B+C.

It will be apparent to those skilled in the art that various modifications and variations can be made to the present invention without departing from the spirit and scope of the invention. Since modifications combinations, sub-combinations and variations of the disclosed embodiments incorporating the spirit and substance of the invention may occur to persons skilled in the art, the invention should be construed to include everything within the scope of the appended claims and their equivalents.

What is claimed is:

1. A method for treating an exhaust stream, comprising:
   receiving an exhaust stream comprising $NO_x$;
   combining the exhaust stream with at least one nitrogen-containing reagent to form a combined stream;
   heating the combined stream to a reaction temperature ranging from about 870° C. to about 1100° C. to react at least a portion of the nitrogen-containing reagent; and
   cooling the reacted stream in a first cooling step to a first temperature; and
   wherein the first cooling step comprises heat exchange between at least a portion of the exhaust stream and at least a portion of the reacted stream.

2. The method of claim 1, wherein the at least one nitrogen-containing reagent is chosen from ammonia, urea, cyanuric acid, hydrazine, and combinations thereof.

3. The method of claim 1, wherein the normal stoichiometric $N/NO_x$ molar ratio between the at least one nitrogen-containing reagent and the NO in the exhaust stream ranges from about 1 to about 3.

4. The method of claim 1, wherein the combined stream further comprises at least one gas chosen from air, oxygen, hydrogen, and combinations thereof.

5. The method of claim 1, further comprising holding at the reaction temperature for a residence time ranging from about 0.1 seconds to about 3 seconds.

6. The method of claim 1, wherein at least about 30% by weight of the $NO_x$ in the exhaust stream is reacted.

7. The method of claim 1, wherein the first temperature ranges from about 700° C. to about 900° C.

8. The method of claim 1, further comprising cooling the reacted stream in a second cooling step to a second temperature, wherein the second cooling step comprises heat exchange between an external stream and at least a portion of the reacted stream.

9. The method of claim 8, wherein the second temperature ranges from about 300° C. to about 500° C.

10. The method of claim 8, wherein the external stream comprises ambient air.

11. The method of claim 1, further comprising combining the reacted stream with a second external stream after the first cooling step.

12. The method of claim 1, further comprising preheating the exhaust stream to a temperature ranging from about 200° C. to about 800° C. prior to the combining step.

13. The method of claim 1, wherein the exhaust stream comprises nitric oxide (NO), nitrogen dioxide ($NO_2$), nitrogen tetroxide ($N_2O_4$), nitrogen pentoxide ($N_2O_5$), or combinations thereof.

14. A method for treating an exhaust stream, comprising:
receiving an exhaust stream comprising $NO_x$;
preheating the exhaust stream to a first temperature;
combining the exhaust stream with at least one nitrogen-containing reagent to form a combined stream;
heating the combined stream to a reaction temperature ranging from about 870° C. to about 1100° C. to react at least a portion of the nitrogen-containing reagent; and
cooling the reacted stream in a first cooling step to a second temperature;
wherein at least one of cooling the reacted stream and preheating the exhaust stream comprises heat exchange between at least a portion of the reacted stream and at least a portion of the exhaust stream.

15. The method of claim 14, wherein the first temperature ranges from about 200° C. to about 800° C.

16. The method of claim 14, wherein the at least one nitrogen-containing reagent is chosen from ammonia, urea, cyanuric acid, hydrazine, and combinations thereof.

17. The method of claim 14, further comprising holding at the reaction temperature for a residence time ranging from about 0.1 seconds to about 3 seconds.

18. The method of claim 14, wherein the second temperature ranges from about 700° C. to about 900° C.

19. The method of claim 14, further comprising cooling the reacted stream in a second cooling step to a third temperature ranging from about 300° C. to about 500° C.

20. A system for treating an exhaust stream comprising $NO_x$, the system comprising:
a heating vessel for heating a combined stream comprising the exhaust stream and at least one nitrogen-containing reagent to a reaction temperature; and
a first heat exchanger for cooling the reacted stream to a first temperature; and
wherein the first heat exchanger transfers heat energy between at least a portion of the exhaust stream and at least a portion of the reacted stream.

21. The system of claim 20, further comprising a vessel for receiving the exhaust stream and combining the exhaust stream with the at least one nitrogen-containing reagent.

22. The system of claim 20, further comprising a reaction vessel for holding the combined stream at the reaction temperature for a residence time sufficient to react at least a portion of the nitrogen-containing reagent.

23. The system of claim 20, further comprising a second heat exchanger for further cooling the reacted stream to a second temperature.

* * * * *

UNITED STATES PATENT AND TRADEMARK OFFICE
CERTIFICATE OF CORRECTION

PATENT NO. : 10,105,645 B2
APPLICATION NO. : 15/561762
DATED : October 23, 2018
INVENTOR(S) : Mao Lin Chung et al.

Page 1 of 1

It is certified that error appears in the above-identified patent and that said Letters Patent is hereby corrected as shown below:

On the Title Page

In Column 1, item (57), Abstract, Line 2, delete "NOx," and insert -- $NO_x$, --, therefor.

In the Claims

In Column 10, Line 56, Claim 3, delete "NO" and insert -- $NO_x$ --, therefor.

Signed and Sealed this
Nineteenth Day of May, 2020

Andrei Iancu
*Director of the United States Patent and Trademark Office*